(12) United States Patent
Elsherbini et al.

(10) Patent No.: US 11,336,559 B2
(45) Date of Patent: May 17, 2022

(54) FAST-LANE ROUTING FOR MULTI-CHIP PACKAGES

(71) Applicant: Intel Corporation, Santa Clara, CA (US)

(72) Inventors: Adel A. Elsherbini, Chandler, AZ (US); Tejpal Singh, Shrewsbury, MA (US); Shawna M. Liff, Scottsdale, AZ (US); Gerald S. Pasdast, San Jose, CA (US); Johanna M. Swan, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 758 days.

(21) Appl. No.: 16/106,926

(22) Filed: Aug. 21, 2018

(65) Prior Publication Data

US 2020/0067816 A1   Feb. 27, 2020

(51) Int. Cl.
*H04L 45/122*   (2022.01)
*H04L 45/12*    (2022.01)
*H04L 9/40*     (2022.01)
*G06F 12/0842*  (2016.01)
*H04L 49/109*   (2022.01)

(52) U.S. Cl.
CPC ........ *H04L 45/122* (2013.01); *G06F 12/0842* (2013.01); *H04L 29/06* (2013.01); *H04L 45/126* (2013.01); *H04L 49/109* (2013.01)

(58) Field of Classification Search
CPC ..... H04L 45/122; H04L 45/126; H04L 29/06; H04L 49/109; H04L 45/121; H04L 49/253; H04L 47/823; G06F 12/0842; G06F 15/7825; G06F 15/7807; H03K 17/04113; H05K 1/141
See application file for complete search history.

(56) References Cited

U.S. PATENT DOCUMENTS

| | | | |
|---|---|---|---|
| 2005/0162797 A1* | 7/2005 | Notthoff | H03K 17/04113 361/100 |
| 2006/0157843 A1* | 7/2006 | Hwang | H05K 1/141 257/686 |
| 2011/0161626 A1* | 6/2011 | Mangione-Smith | H04L 47/823 712/29 |
| 2019/0319626 A1* | 10/2019 | Dabral | G06F 15/7807 |

* cited by examiner

*Primary Examiner* — Vinncelas Louis
(74) *Attorney, Agent, or Firm* — Patent Capital Group

(57) ABSTRACT

Embodiments herein may relate to a processor package with a substrate and a multi-chip processor coupled with the substrate. The multi-chip processor may include a dual-sided interconnect structure coupled with a first chip, a second chip, and a third chip. The first chip may be communicatively coupled with the second chip by an on-chip communication route. Likewise, the second chip may be communicatively coupled with the first chip by an on-chip communication route. Additionally, the first chip may be communicatively coupled with the third chip by a fast-lane communication route. Other embodiments may be described and/or claimed.

22 Claims, 12 Drawing Sheets

US 11,336,559 B2

FAST-LANE ROUTING FOR MULTI-CHIP PACKAGES

BACKGROUND

Multi-chip packages such as a multi-core central processing unit (CPU) may include a number of chips generally arranged in a grid. The chips may communicate with one another through a network on chip (NoC). Latency in communication between the various chips may impact the overall performance of the multi-chip package. This may be particularly problematic in high core count CPUs where the physical distance (and thus the resistive-capacitive (RC) delay of the on-chip wiring) between the core sizes may be relatively large. This latency may increase as the core count of the package increases. This latency may result in diminishing returns for many workloads and even worse performance for high core count packages compared to low core count packages.

DETAILED DESCRIPTION

Figure 1:
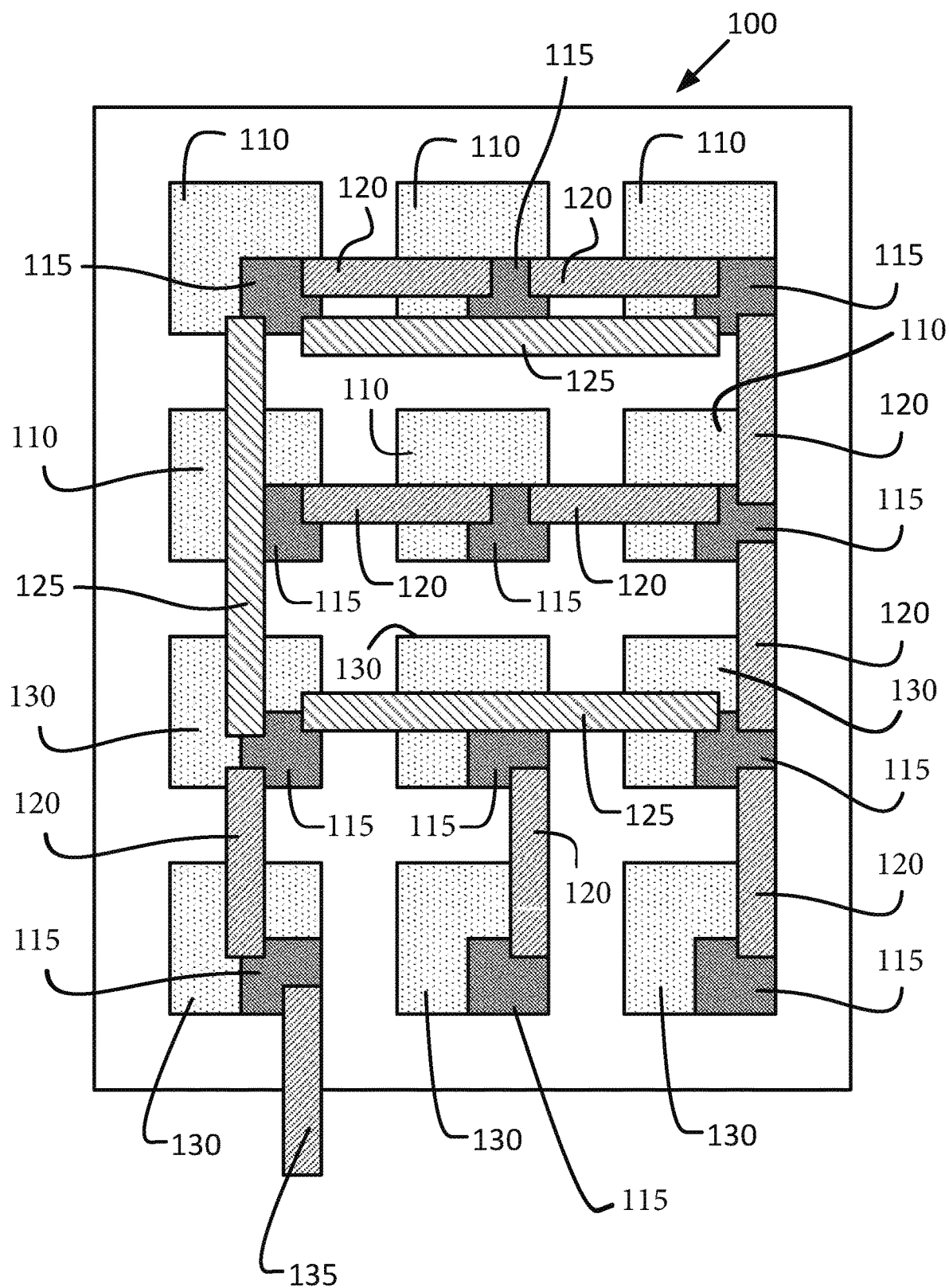
FIG. 1 depicts a simplified top-down view of a chip that includes a plurality of fast-lane routes, in accordance with various embodiments.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

In various embodiments, the phrase "a first feature formed, deposited, or otherwise disposed on a second feature," may mean that the first feature is formed, deposited, or disposed over the feature layer, and at least a part of the first feature may be in direct contact (e.g., direct physical or electrical contact) or indirect contact (e.g., having one or more other features between the first feature and the second feature) with at least a part of the second feature.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an application specific integrated circuit (ASIC), an electronic circuit, a processor (shared, dedicated, or group) or memory (shared, dedicated, or group) that execute one or more software or firmware programs, a combinational logic circuit, or other suitable components that provide the described functionality.

Embodiments herein may be described with respect to various Figures. Unless explicitly stated, the dimensions of the Figures are intended to be simplified illustrative examples, rather than depictions of relative dimensions. For example, various lengths/widths/heights of elements in the Figures may not be drawn to scale unless indicated otherwise.

Embodiments herein may generally be described with respect to circuit blocks, which may include cores of a multi-core processor. Specifically, the multi-core processor may have a number of cores that are each capable of performing a processing task. The various cores of the multi-core processor may be configured to communicate with one another via on-chip wiring. However, other embodiments may relate to a multi-chip package that includes a variety of chips such as a variety of processors that are networked together to communicate with one another. Generally, the multi-core processor may be referred to herein as a "chip," and routing with the multi-core processor may generally be referred to as "on-chip routing." Alternatively, each of the circuit blocks may be its own processor, or some other type of circuit.

As noted above, in some legacy packages a network router at each core of a multi-core chip may transmit or receive data to or from another core of the multi-core chip. Specifically, the data may be transmitted from one core through a plurality of different cores to eventually reach an end-core or an input/output (I/O) block of the chip. However, in some cases a specific on-chip communication pathway between two of the cores may become congested. The congestion may be due to an amount of data travelling through the pathway from different blocks on the chip. The congestion may negatively impact CPU efficiency for a given workload, or reduce performance of high core count CPUs.

Various legacy systems have attempted to resolve the above-described latency issues through a variety of techniques. One such technique has involved using smaller cores. These smaller cores may be used in graphics cards or some high-performance computing applications. However, in many applications, the functionality needed by the core may require a certain minimum core size, which in turn may result in larger cores, larger overall die size, and higher intra-core latency.

Another technique has involved the use of periodic repeaters to boost the signal in on-chip communication routes. However, repeaters may introduce additional delay, which may result in a minimum intrinsic overall delay that cannot be avoided. This delay may increase with the length of the wiring.

Another technique has involved the use of transmission-line like wires instead of standard routing wires for the on-chip routing. These wires may provide a lower delay than standard routing wires. However, the routing density of the transmission-line like wires may be significantly lower than that of standard wires, which may limit the use of the transmission-line like wires in wide buses. Additionally, the transmission-line like wires may require significant routing area on-chip, which may result in less routing resources available for other on-chip blocks.

Another technique has involved the use of additional low-RC wiring on the chip. Specifically, additional top metal layers may be added to the die to allow for more routing resources or more transmission-line like lines. However, these additional metal layers may only be used in certain areas on the chip, and adding extra routing layers in multiple areas over the chip may result in significant cost addition of the chip or additional yield fallout during manufacturing of the chip.

In contrast to the above-described techniques, embodiments herein may overcome the extra delay and also help reduce the network congestion that can occur under high-load operation. Generally, embodiments may be based on assembly or fabrication of low-RC lines to the chip. The low-RC lines may result in a low latency value for the lines. These low-RC/low-latency lines may be referred to herein as "fast-lane" routes or lines. The fast-lane lines may be selectively fabricated or assembled to the chip near the original network routing of the chip. A circuit block's network router may choose whether to send the data through the on-chip routing or the fast-lane routing depending on the destination and the state of the on-chip routing. For example, the network router may choose to send data through the fast-lane routing instead of the on-chip routing if the on-chip route is congested due to supporting communication from other circuit blocks. The network router may also use the fast-lane routing instead of the on-chip routing for latency critical communication packets.

Generally, the fast-lane route may provide a relatively low latency compared to on-chip routing, as it may act as a transmission line with a relatively fast propagation speed. For example, in some embodiments the fast-lane route may have a latency value below 6 picoseconds per millimeter (ps/mm). In some specific embodiments, the fast-lane route may have a latency value between approximately 4 ps/mm and approximately 9 ps/mm. More specifically, in some embodiments the fast-lane route may have a latency value between approximately 5 ps/mm and approximately 7 ps/mm. As a result, this fast-lane route may provide significant increases in transmission speeds between various circuit blocks of the chip, and allow the number of circuit blocks of the chip to increase significantly before performance degradation occurs. Furthermore, the available route paths provided by the fast-lane route may reduce network congestion under various workload conditions. Additionally, embodiments may be implemented as an extra step during the assembly process with relatively low cost and relatively high routing density.

FIG. 1 depicts a simplified top-down view of a chip 100 that may include a plurality of fast-lane routes, in accordance with various embodiments. Generally, FIG. 1 will be described with reference to various enumerated elements, but it will be understood that every element may not be enumerated for the sake of clarity of the Figure. For example, although FIG. 1 is described with reference to various circuit blocks 110 and 130, other circuit blocks may be present and may be identified by common shapes or shading and may be assumed to share features with one or both of circuit blocks 110 or 130, but they may not specifically be enumerated. Other repeated elements may similar be assumed to be related even if they are not specifically enumerated. Additionally, for the purpose of this description, the terminus of elements such as the fast-lane routes 125 or the on-chip routes 120 may be assumed to be the network controller 115 where the element "ends" in the Figure, as described in greater detail below. Finally, it will be understood that the configuration depicted in FIG. 1 is intended to show the different communication paths at a high level. Details on the actual configuration of the various communication paths may be given in later Figures.

Generally, the chip 100 may include a variety of circuit blocks 110 and 130. The circuit blocks 110 and 130 may be, for example, processing cores of a multi-core CPU, memory controller, external I/O circuits for off-die or off-package communications. Alternatively, if the chip 100 is not a single chip but rather is a package that includes a variety of chips, each of the chips of the package may be a processor, a memory, or some other computing element.

In some embodiments, the circuit blocks 130 may be I/O blocks of the chip 100. For example, in some embodiments a circuit block of the blocks 130 may be configured to communicate with a computing element external to the chip in accordance with a peripheral component interconnect express (PCIe) protocol, an ultrapath interconnect (UPI)™ interface, or some other type of interface. Alternatively, one or more of the circuit blocks 130 may be a memory controller or configured to communicate with a memory to which the chip 100 is communicatively coupled. The memory may be, for example, a double data rate (DDR) memory, a flash memory, a read-only memory (ROM), or some other type of memory. Generally, the circuit blocks 130 may be located at an outer portion of the chip 100 as shown in FIG. 1 and one or more of the circuit blocks 130 may have an external connection 135. Generally, the external connection 135 may allow the circuit block 130 to communicate via the I/O protocol or interface discussed above.

Various of the circuit blocks 110 or 130 may be coupled with one another via on-chip routes 120 or fast-lane routes 125. Specifically, network controllers 115 of the various circuit blocks 110 and 130 may be coupled with the on-chip routes 120 and the fast-lane routes 125. The network controllers 115, on-chip routes 120, and fast-lane routes 125 may together comprise the NoC.

The network controllers 115 may be logic elements that are able to identify data received from a circuit block 110/130 and transmit that data over the NoC to another circuit block 110/130. Specifically, for communications between two circuit blocks, which may be referred to in some embodiments as "core to core communications," the network controllers 115 may receive data from a circuit block 110/130 to which the network controller 115 is communicatively coupled and identify, based on an address of the data or some other element of the data, another circuit block 110/130 (or another network controller 115 of a circuit block 110/130) to which the data should be routed. Alternatively, the network controllers 115 may receive data from one of the on-chip routes 120 or the fast-lane routes 125 and identify, based on an address of the data or some other element of the data, another circuit block 110/130 (or another network controller 115 of a circuit block 110/130) to which the data should be routed.

As can be seen, the on-chip routes 120 may directly couple a network controller 115 of one circuit block 110/130 to a network controller 115 of an adjacent circuit block 110/130. Generally, the on-chip routes 120 may have a latency value larger than 20 ps/mm. By contrast, the fast-lane routes 125 may have a lower latency values on the order of between approximately 4 ps/mm and 9 ps/mm as described above. Additionally, the fast-lane routes 125 may skip one or more circuit blocks 110/130 and communicatively couple network controllers 115 of two circuit blocks 110/130 that are not adjacent to one another as shown in FIG. 1.

As can be seen in FIG. 1, the circuit blocks 110/130 may generally be arranged in a grid, and various of the on-chip routes 120 or the fast-lane routes 125 may be coupled laterally or vertically along the grid (with respect to the orientation of FIG. 1). In some embodiments, certain "rows" or "columns" of the grid (again with respect to the orientation of FIG. 1) may include both on-chip routes 120 and fast-lane routes 125, either sequentially or in parallel with one another. Other rows or columns of the grid may only include one or the other of the on-chip routes 120 or the fast-lane routes 125.

It will be understood that the configuration depicted in FIG. 1 is intended only has an example representation, and other embodiments may have more or fewer circuit blocks 110/130, fast-lane routes 125, on-chip routes 120, etc. Additionally, the arrangement of the various elements may be different in other embodiments, for example a fast-lane route 125 may couple two different circuit blocks 110/130 than are shown in FIG. 1. In some embodiments, even though a fast-lane route 125 is depicted as coupling two non-adjacent circuit blocks 110 with only a single circuit block 110 in-between, in other embodiments the fast-lane route 125 may "skip" two or more of the circuit blocks 110. Additionally, even though each circuit block 110/130 is depicted as having its own network controller 115, in some embodiments a single network controller may direct traffic for two or more circuit blocks. In some embodiments the chip as a whole may only have a single network controller and each of the circuit blocks may be coupled with that network controller.

Generally, as described above, the network controller(s) 115 may be able to direct traffic from one circuit block 110/130 to another circuit block 110/130 to route traffic throughout the NoC. The network controller 115 may in some embodiments identify that a certain circuit block 110/130 is congested, or a certain on-chip route 120 is congested. In that case, the network controller 115 may identify a fast-lane route 125 that bypasses the congested on-chip route 120 or congested circuit block 110/130 and choose to transmit the traffic along the fast-lane route 125.

Figure 2:
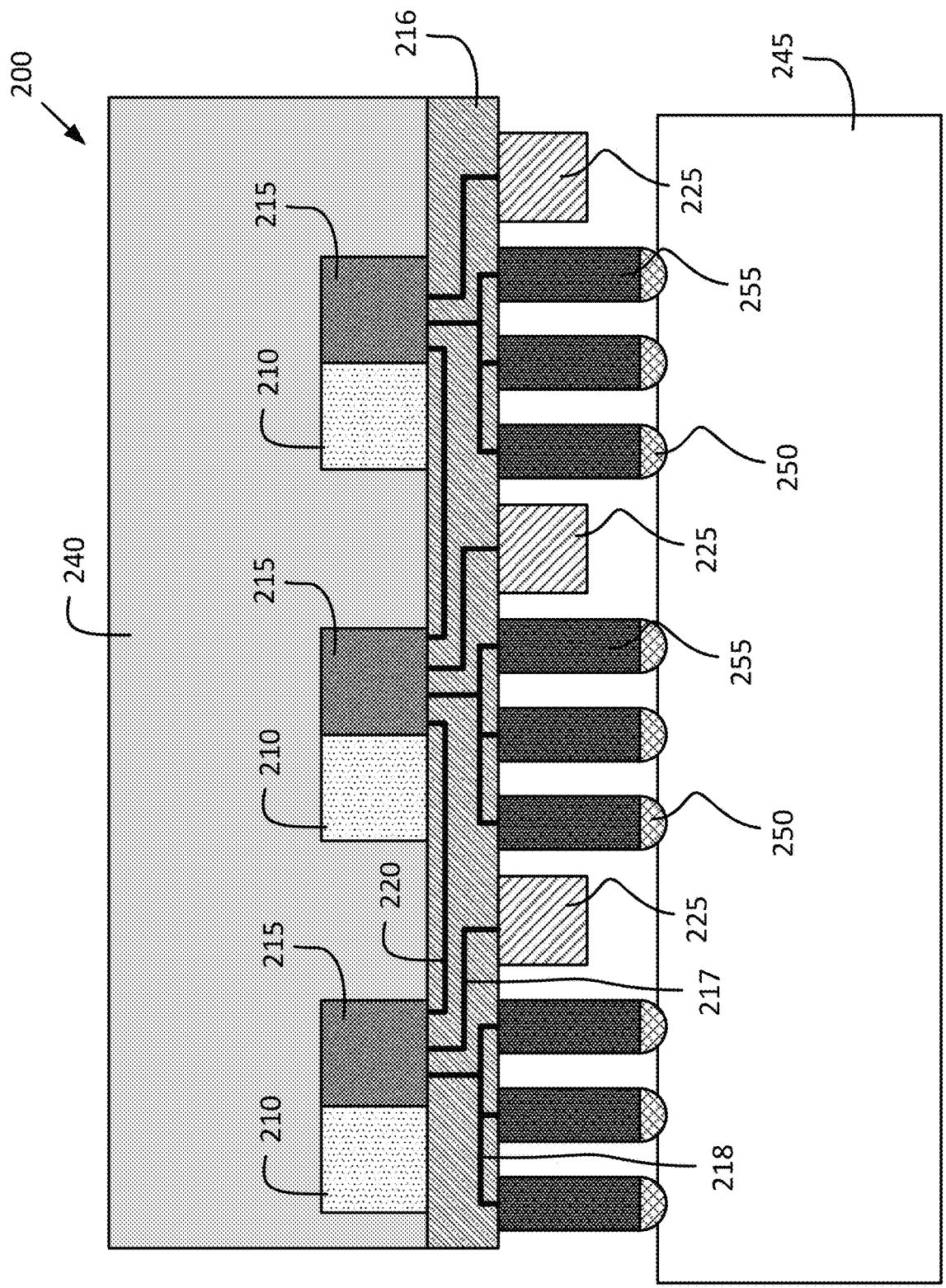
FIG. 2 depicts a simplified example cross-sectional view of a chip that includes a plurality of fast-lane routes, in accordance with various embodiments.

FIG. 2 depicts a simplified example side-view of a chip 200 that may be similar to chip 100. Specifically, the chip 200 may be a monolithic chip, which means the chip 200 may be a unitary structure. Specifically, the chip 200 may include silicon 240 with the circuit blocks 210 positioned therein. The chip may include a plurality of circuit blocks such as circuit blocks 210. The circuit blocks 210 and a plurality of network controllers 215, which may be respectively similar to circuit blocks 110/130 or network controllers 115.

The chip 200 may also include a communication routing structure 216, which may allow different elements of the chip 200 to communicate with one another, as will be described in greater detail below. Additionally, the chip 200 may include fast-lane routes 225, which may be similar to fast-lane routes 125.

In some embodiments, for example as seen in FIG. 2, the fast-lane routes 225 may be on an opposite side of the communication routing structure 216 than the circuit blocks 210 or the network controllers 215. Generally, the fast-lane routes 225 may be implemented as one or more dies, inorganic or organic routing structures that are either coupled with the communication routing structure 216 during fabrication of the chip 200, or are built directly on the communication routing structure 216 as will be described later. In these embodiments, the chip 200 may be coupled with a substrate 245 by one or more pillars 255 and solder bumps 250. The pillars 255 may be pillars formed of a conductive material such as copper, gold, or some other conductive material that is designed to carry signals between the communication routes 220 and the substrate 245 to which the chip 200 is coupled. The pillars 255 may terminate in solder bumps 250 which may be formed out of a solder material such as tin, bismuth, copper, lead, combinations of one or more of the above, or some other solder material. The pillars may have a height sufficient to allow the fast-lane routes 225 to be positioned in the space between the communication routing structure 216 and the substrate 245.

The solder bumps 250 may be bonded with a package substrate such as substrate 245. Specifically, the solder bumps 250 may be bonded with a pad, trace, via, or some other element of the substrate 245 (not shown for the sake of clarity of the Figure). In embodiments, the substrate 245 may be a cored or coreless substrate. In some embodiments, the substrate 245 may be formed of a plurality of layers of dielectric or conductive material, and may include a plurality of traces, vias, etc. The substrate 245 may be, for example, a motherboard, a socket, a printed circuit board (PCB), or some other type of substrate. The dielectric material of the substrate 245 may be, for example, ajimoto build-up film (ABF), a photo-imageable dielectric (PID), or some other type of dielectric substrate. In some embodiments, the substrate 245 may include one or more metallization layers, soldermask layers, etc.

The communication routing structure 216 may include a number of traces and vias at different layers that may couple one or more elements of the chip 200 with another element of the chip 200. Generally, these traces or vias may be formed of a conductive material such as copper, gold, etc. in a multi-layered dielectric substrate. The dielectric substrate may be, for example, ABF, PID, or some other type of dielectric substrate. In some embodiments, the communication routing structure 216 may include traces or vias 218 that communicatively coupled a network controller 215 with one or more of the pillars 255. The communication routing structure 216 may further include traces or vias 217 that communicatively coupled a network controller 215 with a fast-lane route 225. Further, the communication routing structure 216 may include traces or vias that form the on-chip route 220 that couples a network controller 215 of one circuit block 210 with a network controller 215 of an adjacent circuit block 210.

The fast-lane routes 225 may, in turn, include one or more traces or vias that are not shown in FIG. 2 for the sake of clarity of the Figure. Generally, the traces or vias of one of the fast-lane routes 225 may be communicatively coupled with the traces or vias of another of the fast-lane routes 225 such that a circuit block 210 (e.g., the circuit block 210 on the left-most side of FIG. 2) may communication with a non-adjacent circuit block 210 (e.g., the circuit block 210 on the right-most side of FIG. 2) by the fast-lane routes 225.

Figure 3:
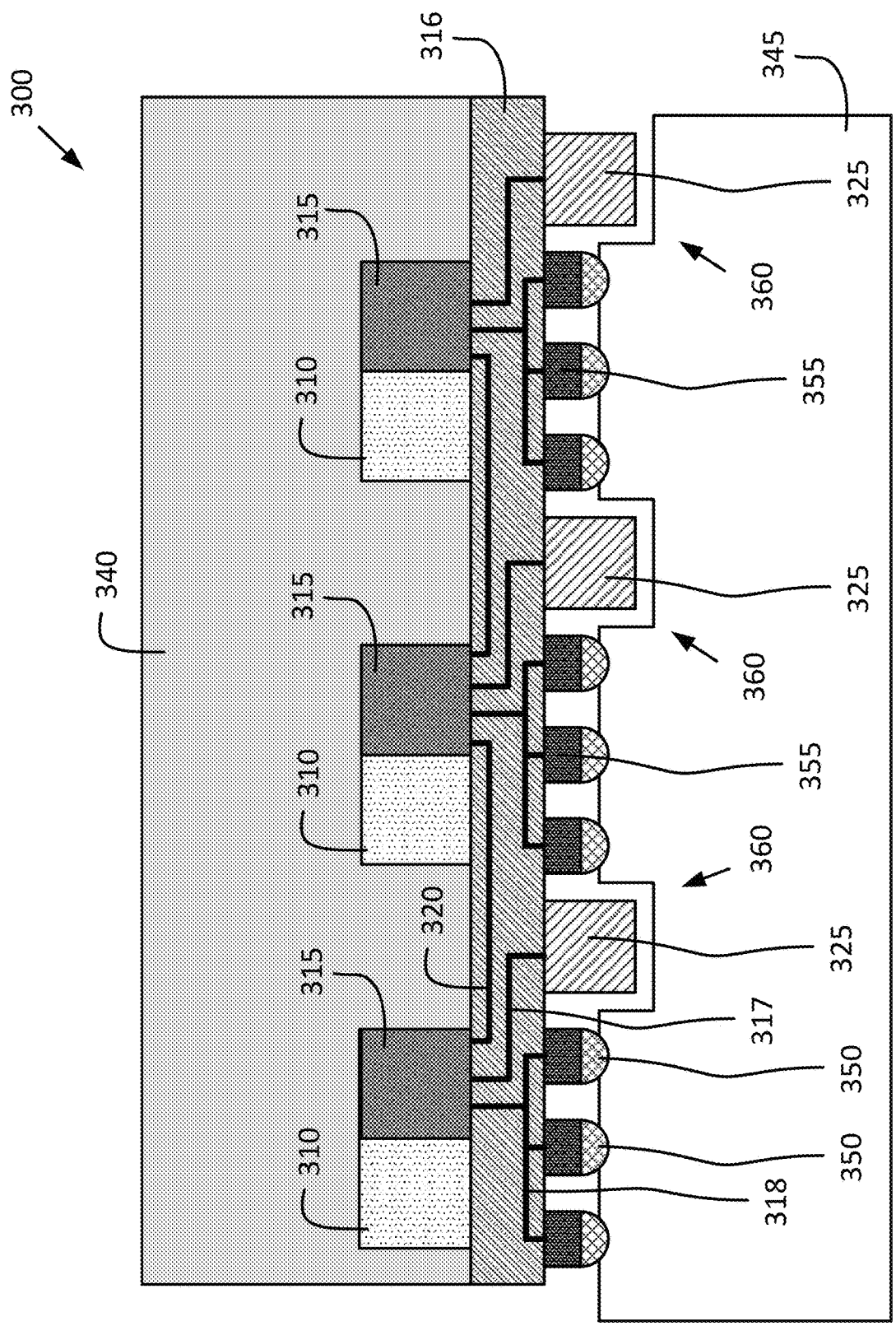
FIG. 3 depicts an alternative simplified example cross-sectional view of a chip that includes a plurality of fast-lane routes, in accordance with various embodiments.

FIG. 3 depicts an alternative simplified example side-view of a chip 300 that may be similar to chip 200. Specifically, the chip 300 may include circuit blocks 310, network controllers 315, silicon 340, communication routing structure 316, traces or vias 317/318, on-chip routes 320, and fast-lane routes 325, all of which may be respectively similar to circuit blocks 210, network controllers 215, silicon 240, communication routing structure 216, traces or vias 217/318, on-chip routes 220, and fast-lane routes 225.

The chip 300 may be coupled with a substrate 345 by one or more pillars 355 that terminate in solder bumps 350. The pillars 355 may be formed of a conductive material such as that described above with respect to pillars 255, and the solder bumps 350 may be formed of a solder material such as that described above with respect to solder bumps 250.

As can be seen in FIG. 3, the substrate 345 may have one or more cavities 360 in which the fast-lane routes 325 may sit when the chip 300 is coupled with the substrate 345. In this embodiment, the pillars 355 may be shorter than the pillars 255 of FIG. 2. The shorter pillars may, for example, decrease the overall z-height (e.g., the height of the package as measured parallel with the pillars 355) of the package that includes the chip 300 and the substrate 345.

Figure 4:
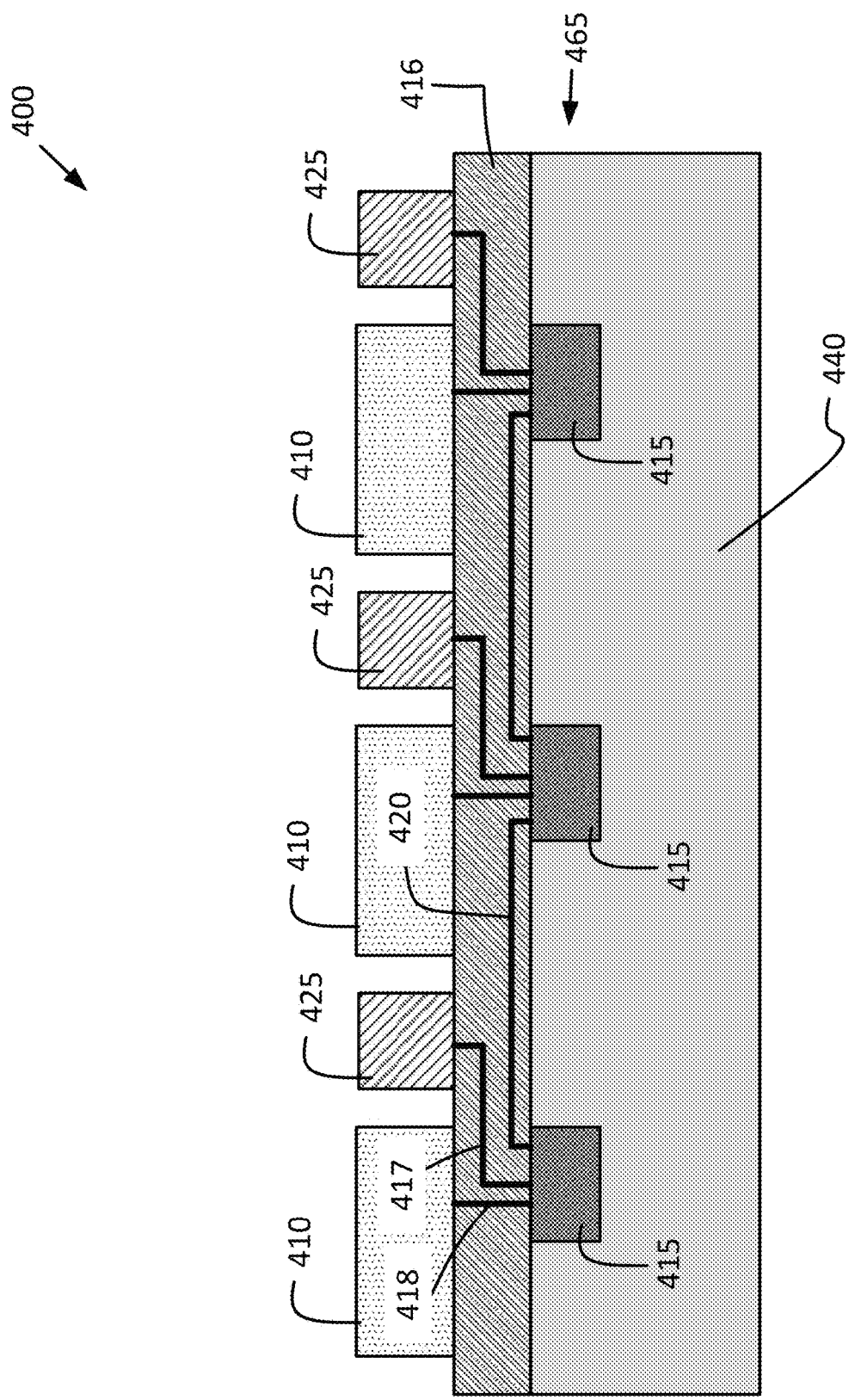
FIG. 4 depicts an alternative simplified example cross-sectional view of a chip that includes a plurality of fast-lane routes, in accordance with various embodiments.

FIG. 4 depicts an alternate arrangement of a chip 400 that includes a plurality of fast-lane routes 425. Specifically, the chip 400 may include a number of circuit blocks 410 which may be similar to circuit blocks 110/130/210/310. The circuit blocks 410 and the fast-lane routes 425 may be coupled with an interconnect structure 465 which may include a silicon 440 (which may be similar to silicon 340), and a communication routing structure 416 which may be coupled with network controllers 415 (which may be similar to network controllers 315). The top side of the chip 400, that is the side that includes the circuit blocks 410 and the fast-lane routes 425, may be overmolded with an overmold material. The overmold material may be an epoxy, plastic or other type of dielectric. It may also contain inorganic fillers to improve its mechanical characteristics.

The communication routing structure 416 may be similar to communication routing structure 316 in that communication routing structure 416 may include a plurality of layers with a plurality of metallic traces or vias therein. The metallic traces or vias of the communication routing structure 416 may allow the communication routing structure 416 to communicatively couple elements of the chip 400 with one another. For example, the communication routing structure 416 may include a first set of traces or vias 418 that may communicatively couple a circuit block 410 with a network controller 415. The communication routing structure 416 may also include a second set of traces or vias 417 that may communicatively couple a network controller 415 with a fast-lane route 425. The communication routing structure 416 may further include on-chip routes 420 that communicatively couples one of the network controllers 415 with another of the network controllers 415.

It will be understood that the specific configurations shown in FIGS. 2-4 are simplified examples of various connections. In some embodiments, the network controllers 415 may be an element of the circuit blocks 410. In other embodiments the network controllers 215 or 315 may be separated from the circuit blocks 210 or 310. In some embodiments the communication routing structures 216/316/416 may include more, fewer, or alternative arrangements of traces or vias than what are shown in FIGS. 2-4. In some embodiments, the communication routing structure 416 may not be a distinct element of the interconnect structure 465 as depicted in FIG. 4, but instead may be generally distributed through the interconnect structure 465. In other embodiments the communication routing structure 416 may be at a different location within the interconnect structure 465 rather than at a portion of the interconnect structure 465 adjacent to the circuit blocks 410. Other arrangements of connection configurations or patterns, or element configurations or patterns, within a die that includes one or more fast-lane routes may be present in other embodiments.

It will further be understood that, as noted above, the specific ratios of the Figures with respect to heights/lengths/widths are not intended to be determinative unless explicitly noted otherwise. Rather, the Figures are simplified examples where certain proportions may be exaggerated for the sake of clarity of the Figure. In embodiments, certain elements such as the circuit blocks, the network controllers, the pillars, or other elements may be larger or smaller with respect to one or more dimensions that shown in the Figures.

In some embodiments the fast-lane routes such as fast-lane routes 125, 225, 325, or 425 may be implemented as distinct dies that are coupled with other elements of a chip such as chips 100, 200, 300, or 400. Specifically, in some embodiments the fast-lane routes may be distinct dies that are soldered to a face of the chip such that the fast-lane route is communicatively coupled with one or more pads, traces, or vias of a communication routing structure such as communication routing structures 216, 316, or 416.

Figure 5:
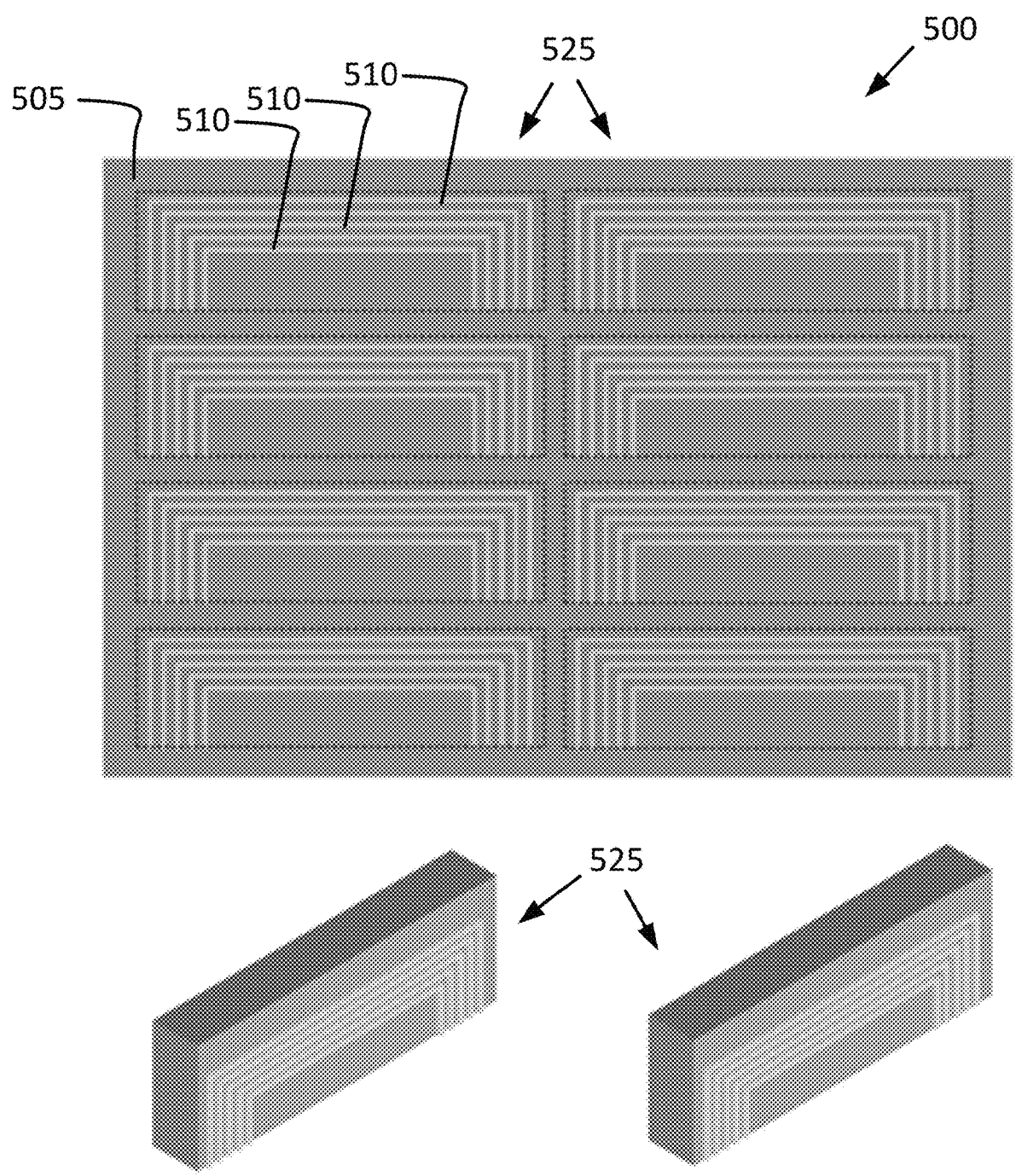
FIG. 5 depicts an example depiction of how a fast-lane route may be generated, in accordance with various embodiments.

FIG. 5 depicts an example of how a fast-lane route may be formed as distinct dies or packages. Specifically, a wafer or a panel 500 may be formed that includes a plurality of fast-lane routes 525, which may be similar to fast-lane routes 125, 225, 325, or 425. The fast-lane routes 525 may include a number of conductive elements 510. The wafer or panel 500 may include a dielectric material 505 that may be, for example, a plastic, an epoxy, a silica-filled resin, a PID, ABF, a silicon-based substrate, an organic substrate, or some other type of dielectric material. The plurality of conductive elements 510 which may be, for example, a conductive material such as copper, gold, etc. may be patterned in the dielectric material 505. The conductive elements 510 may form traces, pads, vias, etc. that allow for signal transference and communication through the fast-lane route n. For example, in some embodiments the conductive elements 510 may be positioned and the dielectric material 505 may be laminated around the conductive elements 510. In other embodiments the dielectric material 505 may be formed and then the conductive elements 510 may be formed by etching and then plating or otherwise depositing the conductive material to form the conductive elements 510. Subsequent to forming the wafer or panel 500, the wafer or panel 500 may be diced or laser cut to form a plurality of fast-lane routes 525. In embodiments, the fast-lane routes 525 may have a width of between approximately 0.5 millimeters (mm) and approximately 2 mm, and a length of between approximately 5 mm and approximately 20 mm. In some embodiments, the fast-lane routes 525 may have between approximately 4 layers and approximately 20 layers of conductive elements 510. However, in other embodiments the fast-lane routes 525 may have different dimensions. In some embodiments, even though the fast-lane routes 525 are depicted as generally rectangular, in other embodiments the fast-lane routes 525 may have other shapes such as generally "L-shaped" or cross shape or some other shape.

It will be understood that the specific number or pattern of elements such as conductive elements 510, or the fast-lane routes 525 themselves, are intended as only an example of one embodiment. Other embodiments may have more or fewer elements, or a different arrangement thereof.

FIGS. 6-9 depict an example technique by which a chip such as chip 400 may be formed. FIGS. 6-9 additionally depict the specific metallic layers of the various elements to provide greater detail regarding connections.

Figure 6:
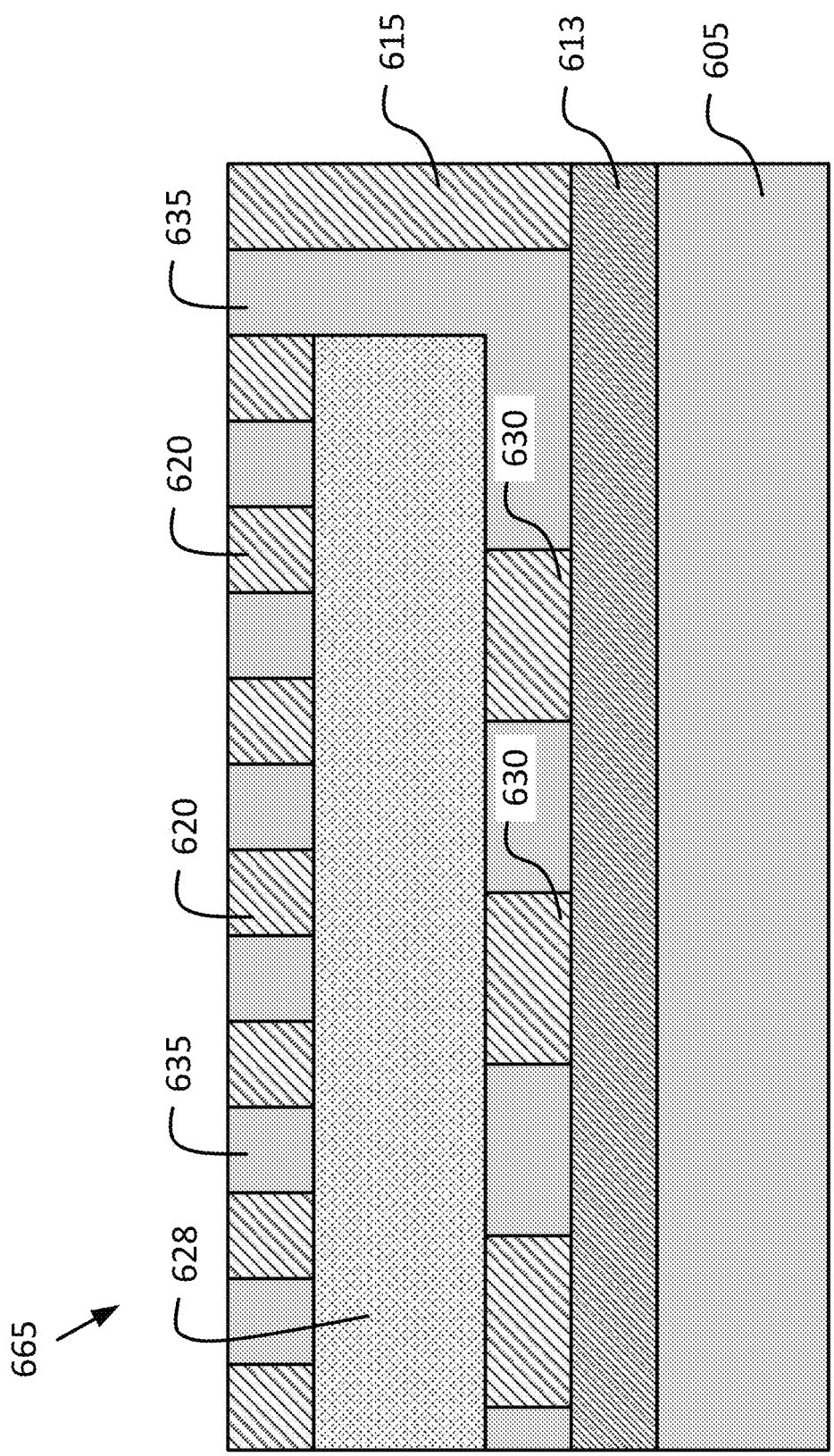
FIG. 6 depicts one stage of an example technique for manufacturing a chip that includes a fast-lane route, in accordance with various embodiments.

As seen in FIG. 6, an interconnect structure 665 may include a substrate 628 with a number of pads 620 and 630 on either side of the substrate. The substrate 628 may be an organic or an inorganic substrate. It may additionally or alternatively be a double-sided semiconductor die with or without active devices. Such an interconnect structure may, in some embodiments, be referred to as a "dual-sided." substrate. The interconnect structure 665 may be similar to, for example, interconnect structure 465. The substrate 628 may be a cored substrate or a coreless substrate. In embodiments, the substrate 628 may have a communication routing structure such as communication routing structure 416, which may have a number of traces or vias such as traces or vias 417/418 or on-chip route 420. In some embodiments, it may also contain the network controllers, 415. The traces and vias of the interconnect structure 665 are not depicted or re-described here for the sake of brevity. In some embodiments, the interconnect structure 665 may further have one or more active elements such as a logic element, a transistor, etc. that may be capable of performing one or more operations on a data signal received from an element to which the interconnect structure 665 is coupled. An interconnect structure with such an element may, in some embodiments, be referred to as an "active interconnect die."

The pads 620 and 630 may be formed of a conductive material such as copper, gold, etc. and may be coupled with the internal traces and vias of the interconnect structure 665 such that an element coupled with the pads 620 may be communicatively coupled with the internal traces and vias of the interconnect structure 665. In some embodiments, the traces and vias of the interconnect structure 665 may couple the pads 620 with the pads 630 such that an element communicatively coupled with the pad 620 may be able to send or receive signals, via the internal traces or vias of the interconnect structure 665, with an element communicatively coupled with the pad 630.

As can be seen, the pads 620 and the pads 630 may have a different pitch from one another. As used herein, "pitch" may refer to a distance of one pad from another pad in a direction parallel with a face of the substrate 628 to which the pads 620/630 are coupled to. Specifically, the pads 620 may have a smaller pitch than the pitch of the pads 630.

In embodiments, the interconnect structure 665, and particularly the pads 630 of the interconnect structure 665, may be coupled with a carrier 605. The carrier 605 may be, for example, a plastic substrate, a steel substrate, a semiconductor or glass wafer or some other rigid or semi-rigid material. In some embodiments, the interconnect structure 665 may be bonded with the carrier 605 by an adhesive material 613. Specifically, the adhesive material 613 may be an adhesive material by which the interconnect structure 665 may be removably coupled with the carrier 605.

In some embodiments a pillar 615 may additionally be coupled with the adhesive 613 or, in other embodiments, the carrier 605. Specifically, the pillar 615 may be formed of a conductive material such as copper, gold, or some other material that may allow for signal communication between two elements coupled with the pillar 615.

Subsequent to coupling the interconnect structure 665 with the carrier 605 or the adhesive material 613, a dielectric material 635 may be applied to the interconnect structure 665. Specifically, a dielectric material may be applied to the interconnect structure 665 through lamination or some other form of deposition. The dielectric material 635 may be, for example, an epoxy material, a photo-definable dielectric, or some other dielectric material that may generally cover the interconnect structure 665 and fill in spaces between, for example, the pads 620, the interconnect structure 665 and the pillar 615, or the pads 630 and the adhesive material 613. In some embodiments, subsequent to application of the dielectric material 635, certain processing techniques such as photo-etching, chemical etching, mechanical etching, grinding or some other type of technique may be used to expose the pads 620 or the pillar 615 as depicted in FIG. 6.

Figure 7:
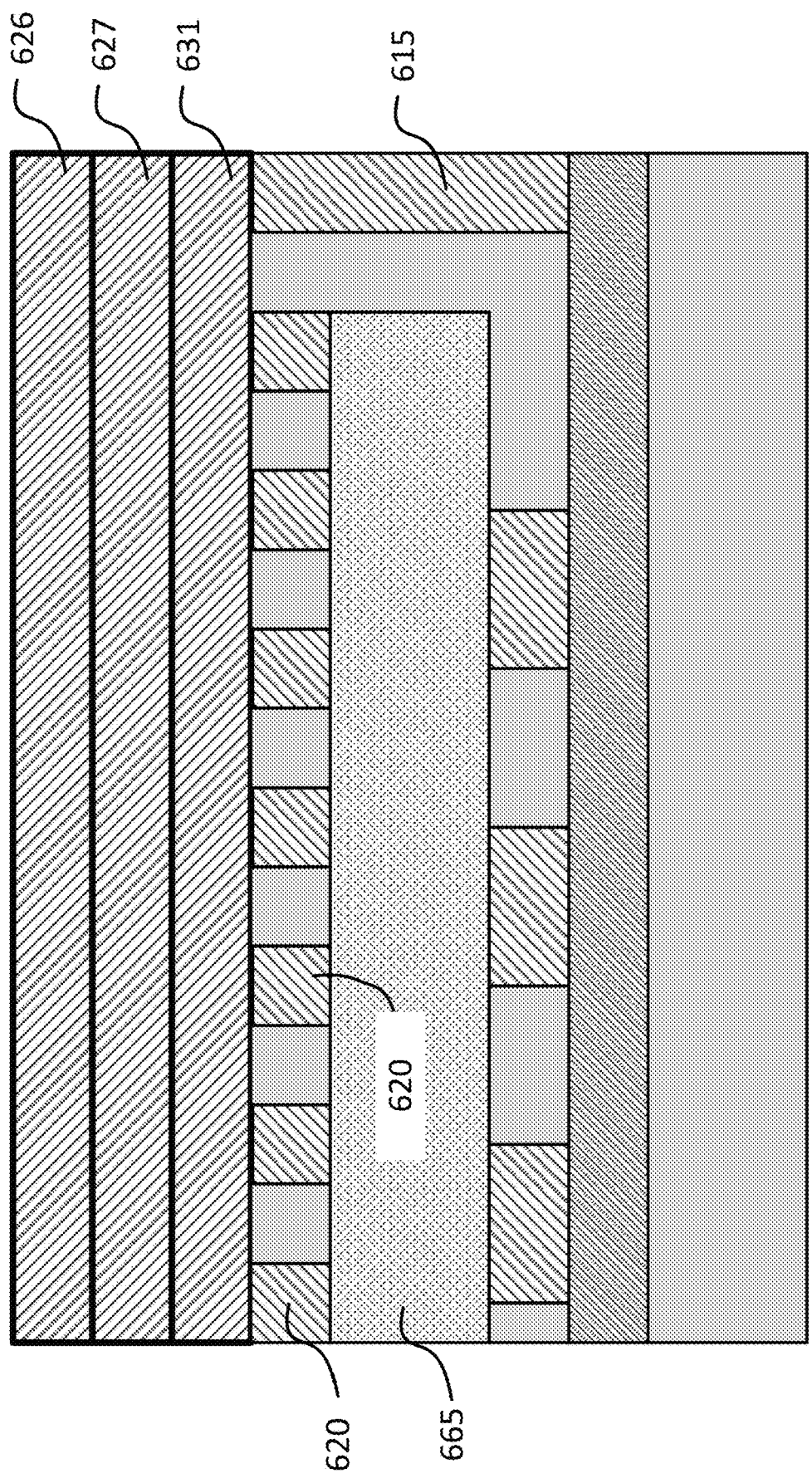
FIG. 7 depicts another stage of an example technique for manufacturing a chip that includes a fast-lane route, in accordance with various embodiments.
Figure 8:
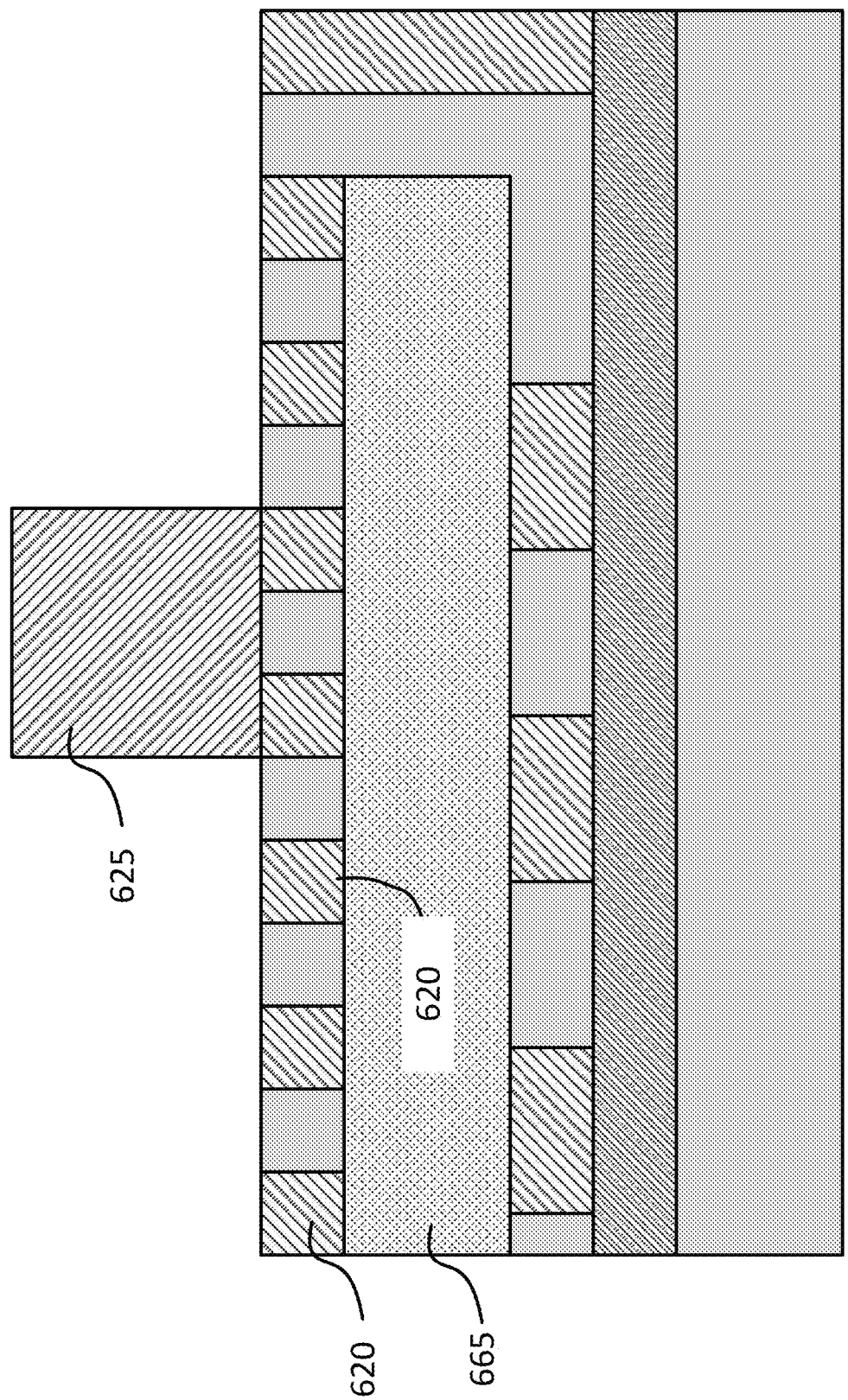
FIG. 8 depicts another stage of an example technique for manufacturing a chip that includes a fast-lane route, in accordance with various embodiments.

FIGS. 7 and 8 depict alternate techniques by which the fast-lane routes may then be introduced to the interconnect structure 665. Specifically, as shown in FIG. 7, a number of layers 626, 627, and 631 may be introduced to the interconnect structure 665. Specifically, layer 631 may be deposited on top of the interconnect structure 665 such that the layer 631 is communicatively coupled with the pad 620 and the pillar 615. The layer 631 may include a dielectric material such as dielectric material 505 and one or more conductive elements such as conductive elements 510. The conductive elements of the layer 631 may be communicatively coupled with, for example pads 630.

In embodiments, deposition of the layer 631 may include a number of steps. Specifically, the conductive elements may first be created. As one example, a seed layer may be deposited, a mask may be created, the conductive elements may be electroplated using the mask, and then the mask may be removed. However, it will be understood that other techniques for creating the conductive elements may exist in other embodiments. Subsequently, the dielectric material may be laminated on top of the conductive elements.

The above-described technique may then be repeated to form layers 627 and 626. Each of the conductive elements of one layer may be communicatively coupled with the conductive element of an adjacent layer. For example, the conductive elements of layer 627 may be communicatively coupled with the conductive elements of layers 626 and 631.

The layers 626, 627, and 631 may then be processed to from a fast-lane route 625, as will be described in further detail below. The fast-lane route may be similar to, for example fast-lane route 425. In embodiments the processing may include, for example, laser cutting, etching, grinding, mechanical cutting, photo-etching, or some other process to remove excess elements of the layers 626, 627, and 631 to leave behind a fast-lane route 625.

By contrast, as shown in FIG. 8, in embodiments where the fast-lane route 625 is a preformed die or package such as fast-lane routes 525, then the fast-lane route 625 may be directly coupled to the interconnect structure 665 by coupling the fast-lane route 625 to the pads 620. Specifically, the fast-lane routes 625 may be coupled to the pads 620 by soldering, hybrid bonding, anisotropic conductive film bonding, copper to copper bonding, or some other adhesion technique.

Figure 9:
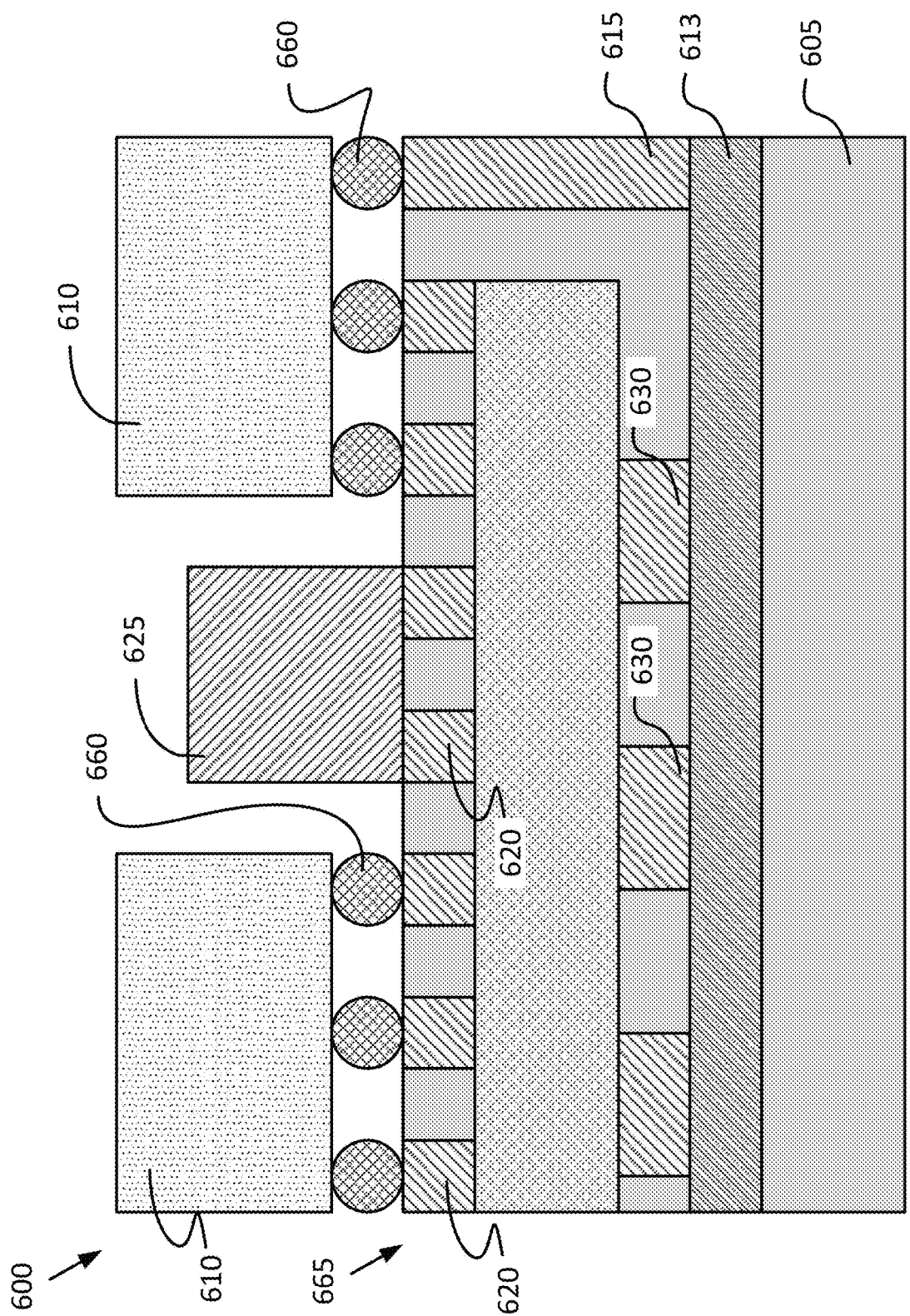
FIG. 9 depicts another stage of an example technique for manufacturing a chip that includes a fast-lane route, in accordance with various embodiments.

As can be seen in FIG. 9, one or more circuit blocks 610, which may be similar to circuit blocks 410, may be attached to the interconnect structure 665 to form a chip 600, which may be similar to chip 400. Specifically, the circuit blocks 610 may be coupled to the pads 620 of the interconnect structure 665 by one or more solder balls 660. The solder balls 660 may be formed of, for example, tin, bismuth, lead, copper, combinations thereof, or some other solder material. A reflow process may then be performed to both physically adhere the circuit blocks 610 to the interconnect structure 665 by the reflowed solder and to communicatively couple the circuit blocks 610 to the pads 620 of the interconnect structure 665. In some embodiments, the circuit block 610 may also be coupled with the pillar 615 by the solder balls 660. In this embodiment, the circuit block 610 may be able to communicate directly with a computing element that is also coupled with the pillar 615, bypassing the active elements of the interconnect structure 665. The adhesive material 613 and the carrier 605 may then be removed and the pillar 615 or the pads 630 may be coupled with another computing element, either directly or by one or more connecting elements such as pillars, solder balls, solder bumps, etc.

It will be understood that the specific order described with respect to FIGS. 6-9, or the specific number of elements, is intended to be an example of one embodiment herein. For example, other embodiments may have different numbers of circuit blocks 610, pads 620/630, etc. In some embodiments the circuit blocks 610 may be coupled with the interconnect structure 665 prior to the coupling of the fast-lane route 625. In embodiments the fast-lane routes 625 may be coupled with the pads 620 by one or more solder balls such as solder balls 660. In some embodiments additional pillars such as pillar 615 may be present, while in other embodiments there may be no pillars. Other variations of the chip 600 or the technique by which the chip is made may be present in other embodiments.

Figure 13:
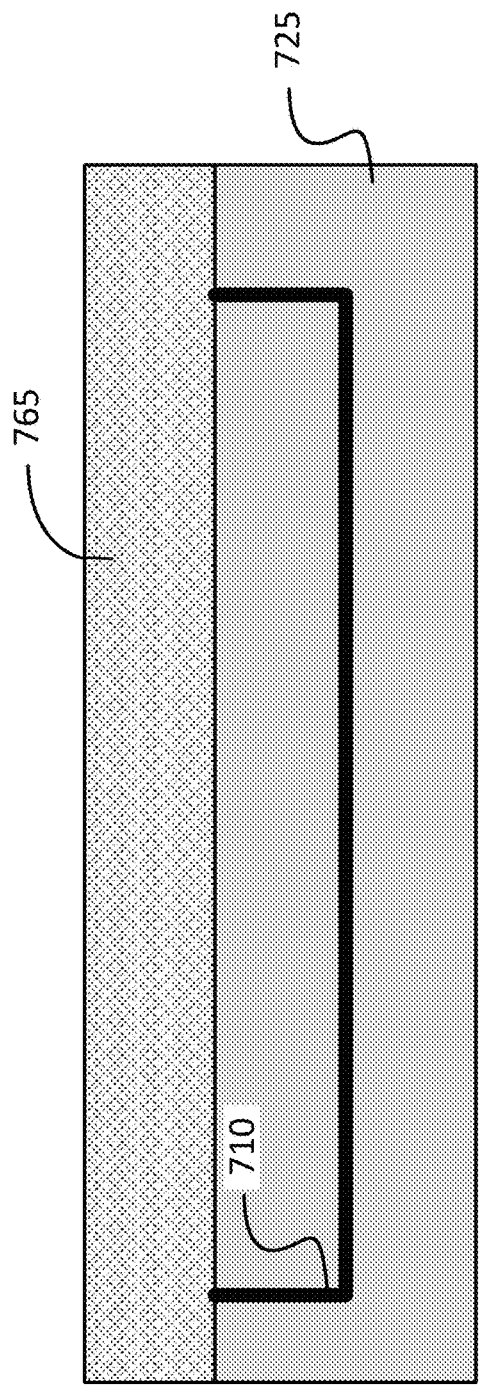
FIG. 13 depicts an alternate example of a routing structure for a fast-lane route, in accordance with various embodiments.
Figure 10:
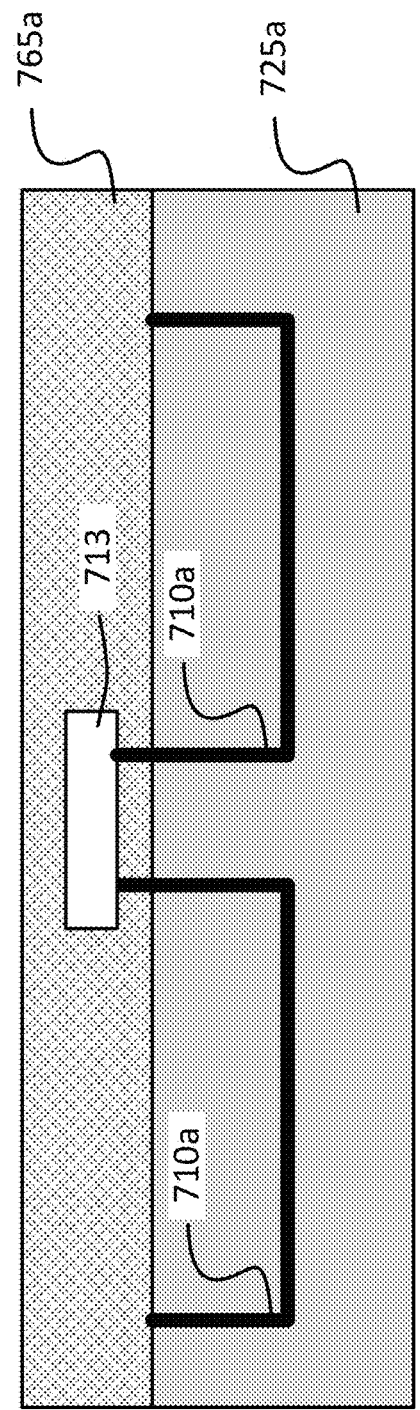
FIG. 10 depicts an example of a routing structure for a fast-lane route, in accordance with various embodiments.

FIGS. 10 and 13 depict two simplified examples of how the fast-lane route may be implemented in various chips. Specifically, FIG. 13 depicts a fast-lane route 725, which may be similar to, for example, fast-lane route 125.

The fast-lane route 725 may include, for example a conductive element 710 which may be similar to conductive elements 510. The fast-lane route 725 may be coupled with an interconnect structure 765 which may be similar to, for example, interconnect structure 665. As can be seen, in FIG. 13 the conductive element 710 may provide a route wherein the conductive element 710 is only coupled with the interconnect structure 765 at two points. In such an embodiment, the conductive element 710 may allow for direct communication between two points.

By contrast, FIG. 10 depicts what may be considered a "multi-hop" route for a fast-lane route 725*a*. Specifically, the fast-lane route 725*a*, which may be similar to fast-lane route 725, may include a plurality of conductive elements 710*a*, which may be similar to conductive elements 710. The fast-lane route 725*a* may be coupled with an interconnect structure 765*a*, which may also be similar to interconnect structure 665. However, as described above, interconnect structure 665 may be an "active" die in that the interconnect structure 665 may have one or more "active" logic elements that are capable of performing one or more computing processes. In this embodiment, the interconnect structure 765*a* may include an active element 713 that is communicatively coupled with the conductive elements 710*a* of the fast-lane route 725*a*. The active element 713 may be, for example, an amplifier, a clocking element, a repeater, etc. Generally, the active element 713 may be configured to shape, amplify, or otherwise enhance the signal propagating through the fast-lane route 725*a*.

It will be understood that the depiction of the elements in FIGS. 10 and 13 are intended as simplified examples and multiple elements (e.g., additional conductive elements of the fast-lane routes 725 or 725*a*, or the interconnect structures 765 or 765*a*) may not be depicted in FIGS. 10 and 13. For example, the fast-lane routes 725 or 725*a* may have additional conductive elements, one or more pads, etc. Additionally, the interconnect structures 765 or 765*a* may have one or more pads, solder balls, cores, etc. However, these elements are not depicted herein for the sake of brevity and clarity.

Figure 11:
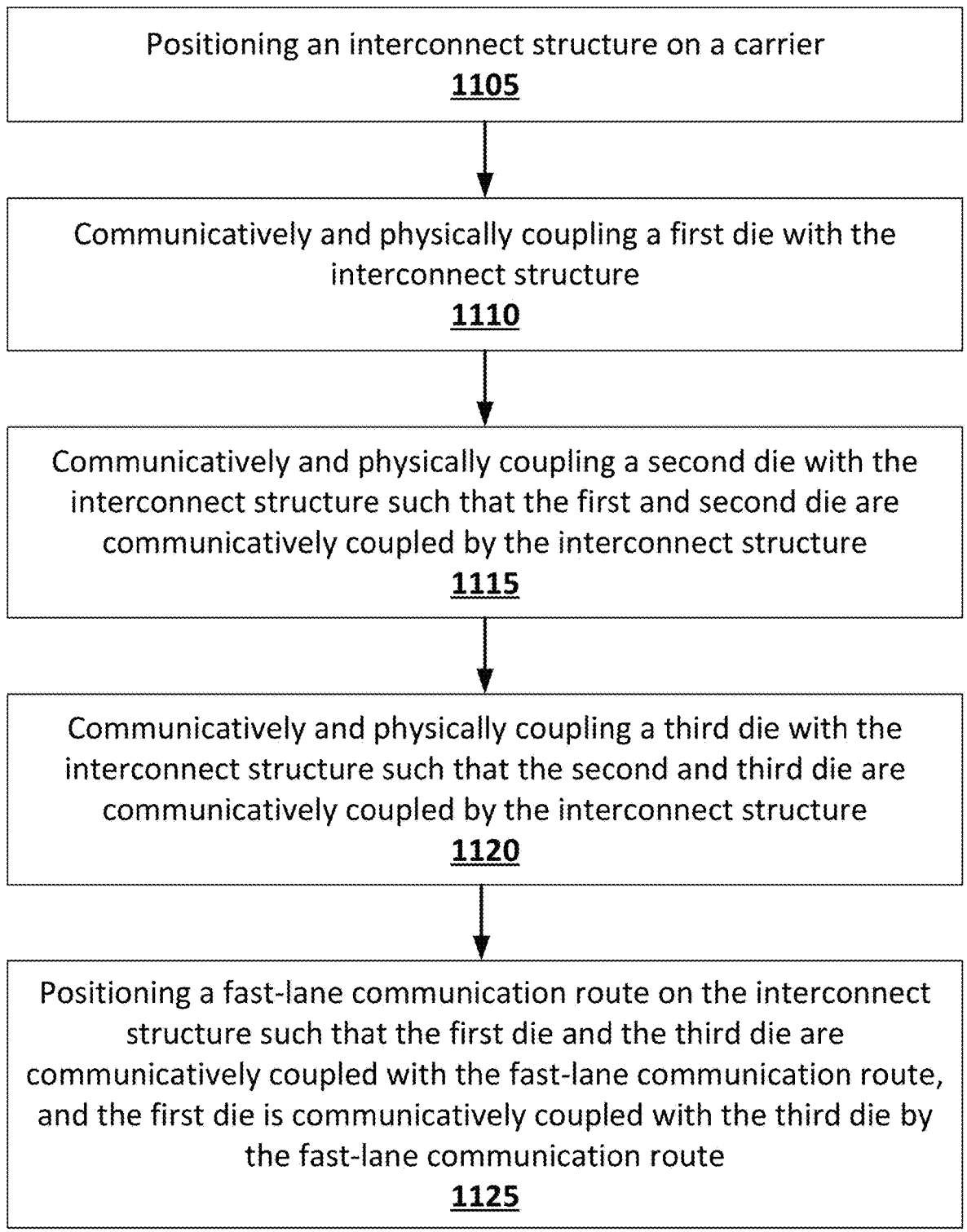
FIG. 11 depicts an example technique for manufacturing a chip that includes a fast-lane route, in accordance with various embodiments.

FIG. 11 depicts an example technique by which a chip such as chips 100, 200, 300, 400, or 600 may be formed. Generally, because the Figures herein are described at different levels of detail, FIG. 11 will be described with reference to both FIG. 1 and FIGS. 6-9.

The technique may include positioning, at 1105, an interconnect structure on a carrier. The interconnect structure may be, for example, interconnect structure 665, and the carrier may be, for example, carrier 605. In some embodiments an adhesive material such as adhesive material 613 may be positioned between the interconnect structure and the carrier such as is shown in FIG. 6.

The technique may further include communicatively and physically coupling a first die with the interconnect structure at 1110, communicatively and physically coupling a second die with the interconnect structure at 1115, and communicatively and physically coupling a third die with the interconnect structure at 1120. The various dies may be similar to, for example, circuit blocks 110 or, more specifically, circuit blocks 610. Generally, the various dies at 1110, 1115, and 1120 may be coupled with the interconnect structure by solder balls such as solder balls 660. The dies may be arranged, for example, such that the second die (or circuit block) is communicatively coupled with the first die and the third die via, for example, on-chip routes such as on-chip routes 120.

The technique may further include positioning, at 1125, a fast-lane communication route on the interconnect structure. The fast-lane communication route may be, for example, similar to fast-lane communication routes 125 and 625. Specifically, as shown in FIG. 1, the fast-lane communication route 125 may couple two non-adjacent dies (or circuit blocks 110) with one another.

It will be understood that the above-described technique described with respect to FIG. 11 is intended as one example of how a chip such as chips 100, 200, 300, 400, or 600 may be manufactured. Other embodiments may include additional elements, or elements may be removed. In some embodiments, certain elements may be performed simultaneously with one another (e.g., elements 1110, 1115, and 1120), or some elements may be performed prior to other elements (e.g., element 1125 may be performed prior to one or more of elements 1110, 1115, and 1120).

Figure 12:
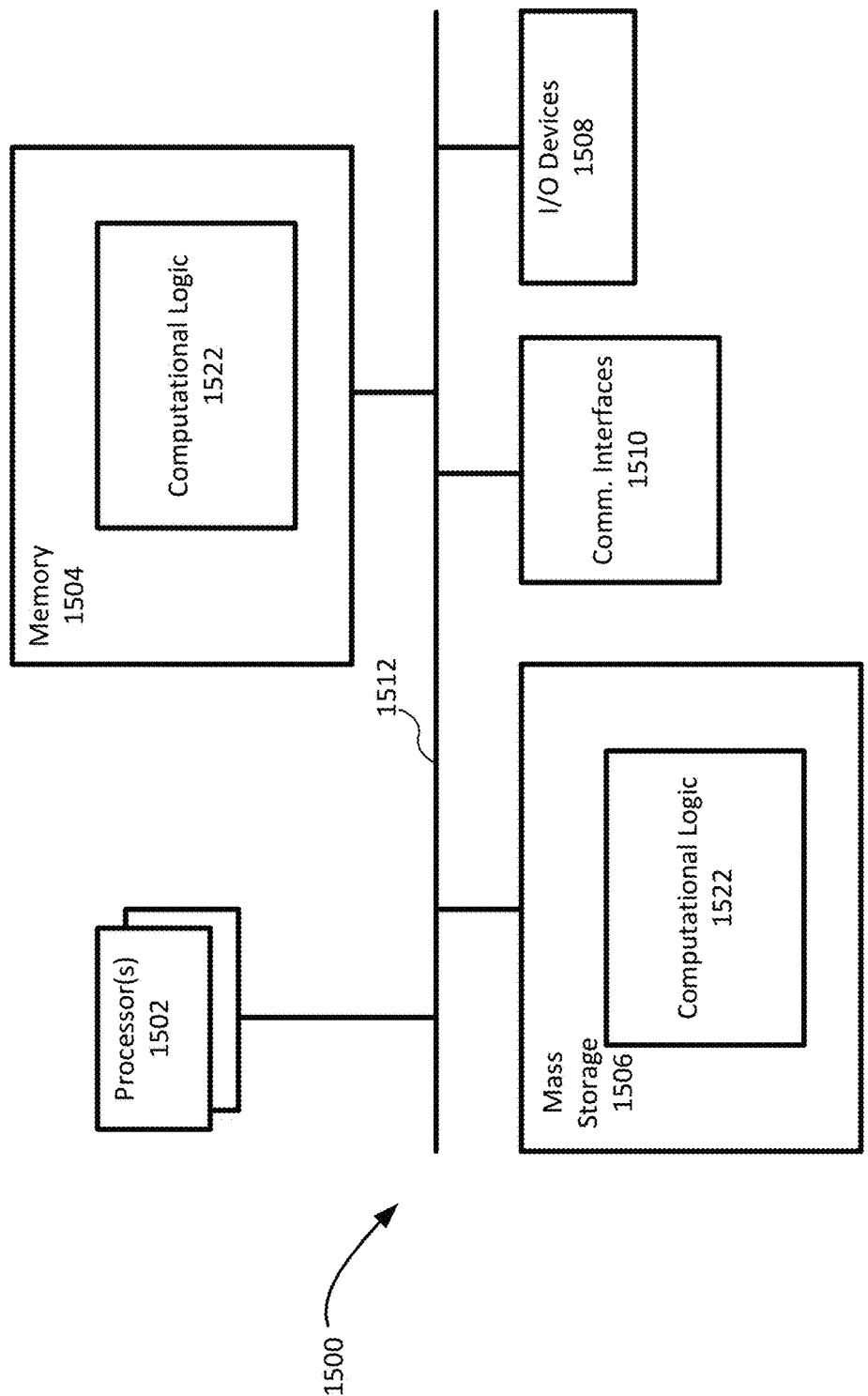
FIG. 12 illustrates an example device, in accordance with various embodiments.

FIG. 12 illustrates an example computing device 1500 suitable for use with chips 100, 200, 300, 400, or 600, in accordance with various embodiments. Specifically, in some embodiments, the computing device 1500 may include chips 100, 200, 300, 400, or 600 therein.

As shown, computing device 1500 may include one or more processors or processor cores 1502 and system memory 1504. For the purpose of this application, including the claims, the terms "processor" and "processor cores" may be considered synonymous, unless the context clearly requires otherwise. The processor 1502 may include any type of processors, such as a central processing unit (CPU), a microprocessor, and the like. The processor 1502 may be implemented as an integrated circuit having multi-cores, e.g., a multi-core microprocessor. The computing device 1500 may include mass storage devices 1506 (such as diskette, hard drive, volatile memory (e.g., dynamic random-access memory (DRAM), compact disc read-only memory (CD-ROM), digital versatile disk (DVD), and so forth). In general, system memory 1504 and/or mass storage devices 1506 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth.

The computing device 1500 may further include input/output (I/O) devices 1508 (such as a display (e.g., a touchscreen display), keyboard, cursor control, remote control, gaming controller, image capture device, and so forth) and communication interfaces 1510 (such as network interface cards, modems, infrared receivers, radio receivers (e.g., Bluetooth), and so forth). In some embodiments, the host device 103 may be elements of computing device 1500 such as processor(s) 1502, memory 1504, mass storage 1506, etc.

The communication interfaces 1510 may include communication chips (not shown) that may be configured to operate the device 1500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond.

The communication interfaces 1510 may operate in accordance with other wireless protocols in other embodiments.

The above-described computing device 1500 elements may be coupled to each other via system bus 1512, which may represent one or more buses. In the case of multiple buses, they may be bridged by one or more bus bridges (not shown). Each of these elements may perform its conventional functions known in the art. The various elements may be implemented by assembler instructions supported by processor(s) 1502 or high-level languages that may be compiled into such instructions.

The permanent copy of the programming instructions may be placed into mass storage devices 1506 in the factory, or in the field, through, for example, a distribution medium (not shown), such as a compact disc (CD), or through communication interface 1510 (from a distribution server (not shown)). That is, one or more distribution media having an implementation of the agent program may be employed to distribute the agent and to program various computing devices.

The number, capability, and/or capacity of the elements 1508, 1510, 1512 may vary, depending on whether computing device 1500 is used as a stationary computing device, such as a set-top box or desktop computer, or a mobile computing device, such as a tablet computing device, laptop computer, game console, or smartphone. Their constitutions are otherwise known, and accordingly will not be further described.

For one embodiment, at least one of processors 1502 may be packaged together with computational logic 1522 configured to practice aspects of optical signal transmission and receipt described herein to form a System in Package (SiP) or a System on Chip (SoC).

In various implementations, the computing device 1500 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 1500 may be any other electronic device that processes data.

In embodiments, various of the elements described with respect to computing device 1500 may be chips 100, 200, 300, 400, or 600. More specifically, a processor 1502 may be implemented as one of chips 100, 200, 300, 400, or 600 wherein the various circuit blocks of the chips are cores of a multi-core processor. Alternatively, in some embodiments one of the circuit blocks of a chip may be one of the elements of the computing device (e.g., processor 1502) and another of the circuit blocks may be another element of the computing device (e.g. memory 1504).

EXAMPLES OF VARIOUS EMBODIMENTS

Example 1 includes a multi-core processor comprising: a first circuit block; a second circuit block communicatively coupled with the first circuit block by a first on-chip communication route; a third circuit block communicatively coupled with the second circuit block by a second on-chip communication route; and a fast-lane communication route that communicatively couples the first circuit block with the third circuit block.

Example 2 include the multi-core processor of example 1, wherein the fast-lane communication route has a latency value between 4 picoseconds per millimeter (ps/mm) and 9 ps/mm.

Example 3 include the multi-core processor of example 1, wherein the first circuit block, the second circuit block, and the third circuit block are coupled with a dual-sided interconnect structure.

Example 4 include the multi-core processor of example 3, wherein the fast-lane communication route is a fast-lane die or package coupled with the dual-sided interconnect structure, and the first circuit block and the third circuit block are communicatively coupled with the fast-lane communication route by the dual-sided interconnect structure.

Example 5 include the multi-core processor of example 3, wherein the dual-sided interconnect structure has a first set of pads at a first pitch on a first side of the dual-sided interconnect structure, and a second set of pads at a second pitch on a second side of the dual-sided interconnect structure opposite the first side.

Example 6 include the multi-core processor of example 3, wherein the fast-lane communication route is a multi-hop route wherein the fast-lane communication route is communicatively coupled with the dual-sided interconnect structure at three points.

Example 7 include the multi-core processor of any of examples 1-6, wherein the multi-core processor further includes an input/output die or a memory, wherein the input/output die or the memory are communicatively coupled with the first circuit block by the fast-lane communication route.

Example 8 include the multi-core processor of any of examples 1-6, wherein the first circuit block is a core of the multi-core processor.

Example 9 includes a processor package comprising: a substrate; and a multi-chip processor coupled with the substrate, wherein the multi-chip processor includes a dual-sided interconnect structure coupled with a first chip, a second chip, and a third chip; wherein: the first chip is communicatively coupled with the second chip by an on-chip communication route; the second chip is communicatively coupled with the first chip by an on-chip communication route; and the first chip is communicatively coupled with the third chip by a fast-lane communication route.

Example 10 include the processor package of example 9, wherein the first chip, the second chip, and the third chip are processor cores of a multi-core processor.

Example 11 include the processor package of example 9, wherein the first chip, the second chip, and the third chip are processors.

Example 12 include the processor package of example 9, wherein the fast-lane communication route is a die coupled with the dual-sided interconnect structure.

Example 13 include the processor package of any of examples 9-12, wherein the fast-lane communication route has a latency value of less than 9 picoseconds (ps) per millimeter (mm).

Example 14 include the processor package of any of examples 9-12, wherein the dual-sided interconnect structure has a first side with a first set of pads with a first pitch, and a second side opposite the first side, wherein the second side has a second set of pads with a second pitch.

Example 15 include the processor package of any of examples 9-12, wherein the first pitch is less than the second pitch.

Example 16 include the processor package of any of examples 9-12, wherein the first chip, the second chip, and the third chip are coupled with the first set of pads.

Example 17 includes a method of forming a package with a fast-lane communication route communicatively coupling two dies, the method comprising: positioning an interconnect structure on a carrier; communicatively and physically coupling a first die with the interconnect structure; communicatively and physically coupling a second die with the interconnect structure such that the first die and the second die are communicatively coupled by the interconnect structure; communicatively and physically coupling a third die with the interconnect structure such that the second die and the third die are communicatively coupled by the interconnect structure; and positioning the fast-lane communication route on the interconnect structure such that the first die and the third die are communicatively coupled with the fast-lane communication route, and the first die is communicatively coupled with the third die by the fast-lane communication route.

Example 18 include the method of example 17, wherein the first die, the second die, and the third die are processor cores of a multi-core processor.

Example 19 include the method of example 17, wherein the first die, the second die, and the third die are processors.

Example 20 include the method of example 17, wherein the interconnect structure is a dual-sided interconnect die.

Example 21 include the method of any of examples 17-20, wherein positioning the fast-lane communication route includes physically and communicatively coupling a fast-lane communication die to the interconnect structure.

Example 22 include the method of any of examples 17-20, wherein positioning the fast-lane communication route includes: forming a conductive element of the fast-lane communication route on the interconnect structure; positioning a dielectric material on the conductive element; and etching the dielectric material to expose the conductive element.

Example 23 include the method of example 22, wherein positioning the dielectric material includes laminating the dielectric material.

Example 24 include the method of example 22, wherein the dielectric material is a photo-definable dielectric material, and etching the dielectric material includes photo-etching the photo-definable dielectric material.

Example 25 include the method of example 22, wherein etching the dielectric material includes chemical or mechanical etching of the dielectric material.

Example 26 includes a computer-readable media comprising instructions that, upon execution of the instructions, are to cause a network router to: identify an on-chip route between a first die and a third die, wherein the on-chip route is a communication route between the first die and a second die, and between the second die and the third die; identify a fast-lane communication route directly between the first die and the third die; and instruct the first die to transmit a signal to the third die via the fast-lane communication route.

Example 27 include the computer-readable media of example 26, further comprising instructions to cause the first die to transmit the signal to the third die based on congestion of the on-chip route or a desired latency target.

Example 28 include the computer-readable media of example 26, wherein the first die, the second die, and the third die are processors.

Example 29 include the computer-readable media of example 26, wherein the first die, the second die, and the third die are processor cores of a multi-core processor.

Example 30 include the computer-readable media of any of examples 26-29, wherein the fast-lane communication route has a latency value of between 4 picoseconds and 9 picoseconds per millimeter.

Example 31 include the computer-readable media of any of examples 26-29, wherein the on-chip route is a first on-chip route, and wherein the third die is communicatively coupled with an input/output (I/O) die and the instructions are further to cause the third die to transmit the signal to the I/O die.

Example 32 include the computer-readable media of any of examples 26-29, wherein the on-chip route is a first on-chip route, and wherein the third die is communicatively coupled with a memory die and the instructions are further to cause the third die to transmit the signal to the memory die.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations of the various embodiments, including what is described in the Abstract, is not intended to be exhaustive or to limit the invention to the precise forms disclosed. While specific implementations of, and examples for, various embodiments are described herein for illustrative purposes, various equivalent modifications are possible within the scope of the invention, as those skilled in the relevant art will recognize. These modifications may be made in light of the above detailed description. The terms used in the following claims should not be construed to limit this disclosure to the specific embodiments disclosed in the specification and the claims.

The invention claimed is:

1. A multi-core processor comprising:
a first circuit block;
a second circuit block communicatively coupled with the first circuit block by a first on-chip communication route;
a third circuit block communicatively coupled with the second circuit block by a second on-chip communication route; and
a fast-lane communication route that communicatively couples the first circuit block with the third circuit block, wherein the first circuit block communicates with the third circuit block via the fast-lane communication route based on congestion of the on-chip route.

2. The multi-core processor of claim 1, wherein first circuit block communicates with the third circuit block via the fast-lane communication route based on a desired latency target and the desired latency target is at least partially based on a latency value of the fast-lane communication route, and wherein the latency value of the fast-lane communication route is between 4 picoseconds per millimeter (ps/mm) and 9 ps/mm.

3. The multi-core processor of claim 1, wherein the first circuit block, the second circuit block, and the third circuit block are coupled with a dual-sided interconnect structure.

4. The multi-core processor of claim 3, wherein the fast-lane communication route is a multi-hop route wherein the fast-lane communication route is communicatively coupled with the dual-sided interconnect structure at three points.

5. The multi-core processor of claim 1, wherein the multi-core processor further includes an input/output die or a memory, wherein the input/output die or the memory are communicatively coupled with the first circuit block by the fast-lane communication route.

6. The multi-core processor of claim 1, wherein the first circuit block is a core of the multi-core processor.

7. A processor package comprising:
a substrate; and
a multi-chip processor coupled with the substrate, wherein the multi-chip processor includes a dual-sided interconnect structure coupled with a first chip, a second chip, and a third chip;
wherein:
the first chip is communicatively coupled with the second chip by an on-chip communication route;
the second chip is communicatively coupled with the first chip by an on-chip communication route; and
the first chip is communicatively coupled with the third chip by a fast-lane communication route, wherein the first chip communicates with the third chip by the fast-lane communication route based on congestion of the on-chip route.

8. The processor package of claim 7, wherein the first chip, the second chip, and the third chip are processor cores of a multi-core processor.

9. The processor package of claim 7, wherein the first chip, the second chip, and the third chip are processors.

10. The processor package of claim 7, wherein the fast-lane communication route is a die coupled with the dual-sided interconnect structure.

11. The processor package of claim 7, wherein the first circuit block communicates with the third circuit block via the fast-lane communication route based on a desired latency target and the desired latency target is at least partially based on a latency value of the fast-lane communication route, and wherein the latency value of the fast-lane communication route is less than 9 picoseconds (ps) per millimeter (mm).

12. The processor package of claim 7, wherein the dual-sided interconnect structure has a first side with a first set of pads with a first pitch, and a second side opposite the first side, wherein the second side has a second set of pads with a second pitch.

13. A method of forming a package with a fast-lane communication route communicatively coupling two dies, the method comprising:
positioning an interconnect structure on a carrier;
communicatively and physically coupling a first die with the interconnect structure;
communicatively and physically coupling a second die with the interconnect structure such that the first die and the second die are communicatively coupled by the interconnect structure;
communicatively and physically coupling a third die with the interconnect structure such that the second die and the third die are communicatively coupled by the interconnect structure; and
positioning the fast-lane communication route on the interconnect structure such that the first die and the third die are communicatively coupled with the fast-lane communication route, and the first die is communicatively coupled with the third die by the fast-lane communication route, wherein positioning the fast-lane communication route includes:
forming a conductive element of the fast-lane communication route on the interconnect structure;
positioning a dielectric on the conductive element; and
etching the dielectric to expose the conductive element.

14. The method of claim 13, wherein the first die, the second die, and the third die are processor cores of a multi-core processor.

15. The method of claim 13, wherein the first die, the second die, and the third die are processors.

16. The method of claim 13, wherein the interconnect structure is a dual-sided interconnect die.

17. A non-transitory computer-readable media comprising instructions that, upon execution of the instructions, are to cause a network router to:
identify an on-chip route between a first die and a third die, wherein the on-chip route is a communication route between the first die and a second die, and between the second die and the third die;
identify a fast-lane communication route directly between the first die and the third die; and
instruct the first die to transmit a signal to the third die via the fast-lane communication route based on congestion of the on-chip route.

18. The non-transitory computer-readable media of claim 17, wherein the first die, the second die, and the third die are processors.

19. The non-transitory computer-readable media of claim 17, wherein the first die, the second die, and the third die are processor cores of a multi-core processor.

20. The non-transitory computer-readable media of claim 17, wherein the first circuit block communicates with the third circuit block via the fast-lane communication route based on a desired latency target and the desired latency target is at least partially based on a latency value of the fast-lane communication route, and wherein the latency value of the fast-lane communication route is between 4 picoseconds and 9 picoseconds per millimeter.

21. The non-transitory computer-readable media of claim 17, wherein the on-chip route is a first on-chip route, and wherein the third die is communicatively coupled with an input/output (I/O) die and the instructions are further to cause the third die to transmit the signal to the I/O die.

22. The non-transitory computer-readable media of claim 17, wherein the on-chip route is a first on-chip route, and wherein the third die is communicatively coupled with a memory die and the instructions are further to cause the third die to transmit the signal to the memory die.

* * * * *